(12) United States Patent
Song et al.

(10) Patent No.: US 11,124,088 B2
(45) Date of Patent: Sep. 21, 2021

(54) METHOD FOR TRANSMITTING TRACTION POWER NETWORK DATA

(71) Applicant: Nanjing Institute of Railway Technology, Nanjing (CN)

(72) Inventors: Qihou Song, Changzhou (CN); Honggao Feng, Changzhou (CN); Baichuan Xu, Changzhou (CN)

(73) Assignee: Nanjing Institute of Railway Technology, Nanjing (CN)

( * ) Notice: Subject to any disclaimer, the term of this patent is extended or adjusted under 35 U.S.C. 154(b) by 74 days.

(21) Appl. No.: 16/706,818

(22) Filed: Dec. 8, 2019

(65) Prior Publication Data
US 2020/0398698 A1   Dec. 24, 2020

(30) Foreign Application Priority Data
Jun. 24, 2019   (CN) .......................... 201910548093.4

(51) Int. Cl.
| | | |
|---|---|---|
| *B61L 27/00* | (2006.01) | |
| *B60M 5/02* | (2006.01) | |
| *B60M 3/00* | (2006.01) | |
| *H04L 29/08* | (2006.01) | |
| *G08C 17/00* | (2006.01) | |

(52) U.S. Cl.
CPC ................ *B60M 5/02* (2013.01); *B60M 3/00* (2013.01); *G08C 17/00* (2013.01); *H04L 29/08* (2013.01)

(58) Field of Classification Search
CPC ....................................................... B61L 27/00
See application file for complete search history.

(56) References Cited

U.S. PATENT DOCUMENTS

| | | | | |
|---|---|---|---|---|
| 4,179,744 A | * | 12/1979 | Lowe ....................... | B61L 1/08 246/122 R |
| 4,577,494 A | * | 3/1986 | Jaeggi ...................... | G01B 7/34 73/105 |
| 6,796,187 B2 | * | 9/2004 | Srinivasan ............. | G01D 9/005 73/784 |
| 2005/0127891 A1 | * | 6/2005 | Bae ......................... | G01N 17/02 324/72 |
| 2006/0038525 A1 | * | 2/2006 | Kishida .............. | G01R 31/2887 318/649 |
| 2017/0168106 A1 | * | 6/2017 | Bridges .................. | G01R 31/52 |
| 2019/0170692 A1 | * | 6/2019 | Kawabata .............. | G01B 7/345 |

* cited by examiner

*Primary Examiner* — Olisa Anwah
(74) *Attorney, Agent, or Firm* — Idea Intellectual Limited; Margaret A. Burke; Sam T. Yip

(57) ABSTRACT

The present invention provides a method for transmitting the electric power data of a rail includes collecting electrical current analog signals from a conductor rail and transmitting the electrical current analog signals to a processing module; converting the electrical current analog signals into electrical current digital signals through the processing module; transmitting the electrical current digital signals to a monitoring platform through a wireless communication module. The electrical current information of the conductor rail is collected by an electric current sensor installed on a cable, which is connected to the conductor rail. The electrical current information collected by the electric current sensor is transmitted to the processing module after pre-processing comprising signal amplification and filtering. The present method effectively prevents problems of high bit error rates and faults with a negative impact on the data transmission with data message corrupted by noise during transmission.

11 Claims, 4 Drawing Sheets

---

Sending a link establishment instruction from the wireless communication module to a main router — S31

⬇

The main router establishes a first dedicated data link and a second dedicated data link between the wireless communication module and the monitoring platform in a wireless network according to the link establishment instruction and sends the first dedicated data link and the second dedicated data link information to the wireless communication module and the monitoring platform in the wireless network — S32

⬇

The wireless communication module transmits the electrical current digital signals to the monitoring platform via the first dedicated data link and the second dedicated data link — S33

| Sending a link establishment instruction from the wireless communication module to a main router | S31 |

| The main router establishes a first dedicated data link and a second dedicated data link between the wireless communication module and the monitoring platform in a wireless network according to the link establishment instruction and sends the first dedicated data link and the second dedicated data link information to the wireless communication module and the monitoring platform in the wireless network | S32 |

| The wireless communication module transmits the electrical current digital signals to the monitoring platform via the first dedicated data link and the second dedicated data link | S33 |

FIG. 2

Copying the electrical current digital signals transmitted from the cable and creating a duplicate of the electrical current digital signals transmitted from the cable — S3321

Assembling the electrical current digital signals transmitted from the cable into the first data message, and assembling the duplicate of the electrical current digital signals into the second data message — S3322

FIG. 4

METHOD FOR TRANSMITTING TRACTION POWER NETWORK DATA

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims priority to China Patent Application No. 201910548093.4, filed Jun. 24, 2019; the disclosures of which are incorporated by reference herein in its entirety.

FIELD OF THE INVENTION

The present invention relates to the technical field of electrical railway power network communication. More specifically, it relates to methods for transmitting traction power network data.

BACKGROUND

Rails are used as the return conductors in the direct current (DC) electrified railway systems such as urban rail transit. Because the rails cannot be completely insulated from the ground, a part of the load electrical current may flow from the rails to the cross-sleepers, the track beds, and the underground rail metal installations. This portion of the electrical current is called stray current. Meanwhile, the running rails themselves have leakage resistance, hence a certain suspension voltage potential difference may be sustained by the rails and then shorted to the ground when a train starts, moves, or a system short-circuit fault occurs. This suspension voltage potential difference is called the rail potential.

Furthermore, most traditional urban rail traction returning networks use the running rails as the return rails. The running rails have a higher potential than the surrounding track beds or the tunnel structures. The running rails cannot be completely insulated from the track beds due to actual and operating conditions of the facility. Therefore, the high potential electrical current of the running rails may flow toward the track beds or the tunnel structure reinforcements through the leaking resistance between the running rails, the track beds, or the tunnel, and then becoming the stray current. The stray current causes the electrochemical corrosion of the equipment such as steel bars and metal pipelines inside the underground structure, reduces the structural strength, thus affecting overall useful life of the structural parts such as the track beds, etc. Meanwhile, a higher potential difference is sustained on the running rails when the traction returning networks pass through the running rails. If the electrical current flows from the wheels to the train compartment, it will threaten the personal safety of passengers. Even though potential limiters of the running rails are installed at the train stations to ensure safety, the operational reliability of the power supply system would be affected due to the frequent actions and cause problems related to high bit error rate in data transmission where data messages are corrupted by signal noise during transmission.

SUMMARY OF THE INVENTION

This section aims to summarize some aspects of the embodiments of the present invention and to briefly describe some preferred embodiments. Simplification or omission may be made in this section, the abstract of the specification, and the title to avoid obscuring the purposes of this section, the abstract of the specification, and the title. Such simplification or omission may not be regarded as to limit the scope of the present invention.

The present invention is made in view of the problems related to high bit error rates in data transmission where data messages are being corrupted by signal noise during transmission.

Therefore, one of the objectives of the present invention is to provide a method for transmitting the electric power data of a rail.

The present invention provides the following solutions: the present method effectively avoids the problems regarding a high bit error rate, and defects with a negative impact on the transmission when the data message is disturbed by noise during transmission.

BRIEF DESCRIPTION OF THE DRAWINGS

In order to more clearly illustrate the technical solution from the embodiments of the present invention, the drawings used in the description of the embodiments are briefly described below. Obviously, the drawings provided hereinafter represent only some embodiments of the present invention, and other drawings may also be derived therefrom by persons having ordinary skill in the art in view of the drawings, in which:

FIG. 2 depicts a schematic diagram of the step S3;

FIG. 4 depicts a schematic diagram of the step S332.

DETAILED DESCRIPTION

The above described objectives, features and advantages of the present invention will become more apparent from the detailed description.

EXAMPLES

Example 1

Figure 1:
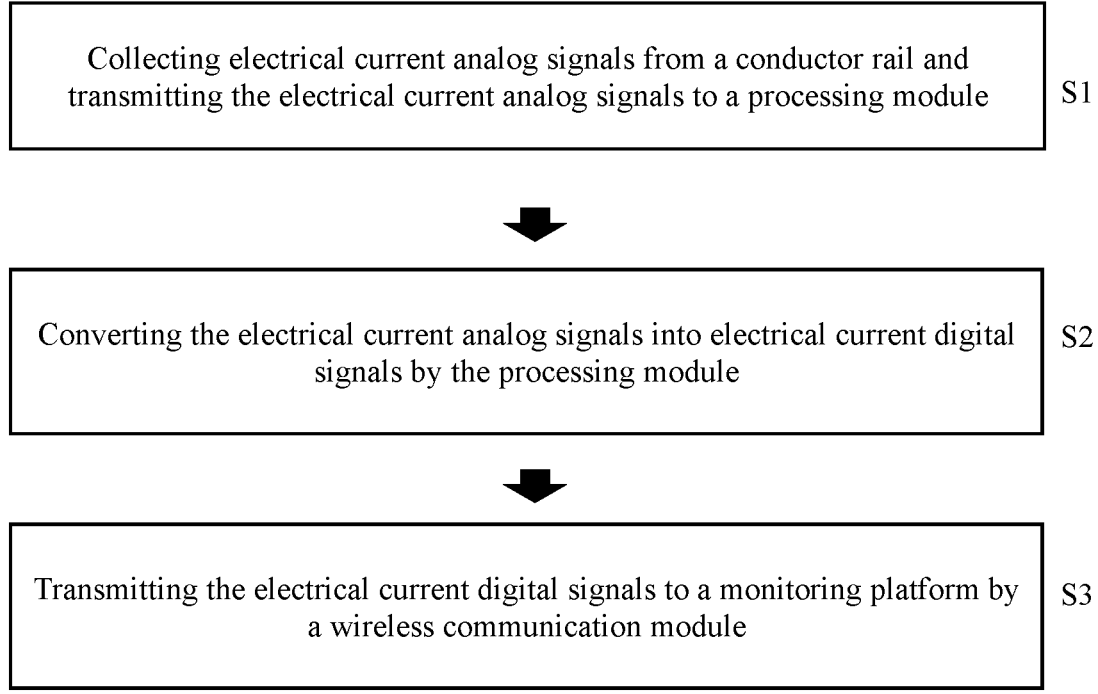
FIG. 1 depicts a schematic diagram of the overall process of the method for transmitting the electric power data of a rail.

Referring to FIG. 1, a schematic diagram of the overall process of the method for transmitting the electric power data of a rail is provided. As shown in FIG. 1, the method for transmitting the electric power data of a rail includes the steps of:

S1: Collecting electric current analog signals from a conductor rail and transmitting the electric current analog signals to a processing module;

S2: Converting the electric current analog signals into electric current digital signals by the processing module;

S3: Transmitting the electric current digital signals to a monitoring platform by a wireless communication module.

More specifically, the method of the present invention includes the steps of:

S1: Collecting electric current analog signals from a conductor rail and transmitting the electric current analog signals to a processing module. The electric current information of the conductor rail is collected by an electric current sensor installed on a cable, which is connected to the conductor rail; wherein the electrical current information collected by the electric current sensor is transmitted to the processing module after a pretreatment comprising signal amplification and filtering; and wherein the processing module is a single-chip microcomputer.

S2: Converting the electrical current analog signals into electrical current digital signals by the processing module.

S3: Transmitting the electrical current digital signals to a monitoring platform through a wireless communication module.

The present method effectively avoids the problems related to high bit error rates and defects that negatively impact the data transmission when the data message is corrupted by signal noise during transmission.

Furthermore, as shown in FIG. 2, the method of transmitting the electrical current digital signals to a monitoring platform through a wireless communication module comprises the following steps:

S31: Sending a link establishment instruction from the wireless communication module to a main router; wherein the link establishment instruction is an identifier of the wireless communication module and the monitoring platform in the wireless network; and wherein the link establishment instruction is sent to a main router first before the wireless communication module sending the link establishment instruction to the monitoring platform in the wireless network.

S32: The main router establishes a first dedicated data link and a second dedicated data link and sets them in between the wireless communication module and the monitoring platform in a wireless network in accordance with the link establishment instruction. The first dedicated data link and the second dedicated data link are assigned to the data messages to be transmitted, and the wireless communication module and the monitoring platform in the wireless network are the two ends used in the data message transmission. The identifier of the wireless communication module is a marker of the wireless communication module, and the identifier of the monitoring platform in the wireless network is a marker of the monitoring platform in the wireless network. In addition, the identifiers of both the wireless communication module and the monitoring platform in the wireless network are unique. The markers can be set in advance. It is noted that the link establishment instruction is a message transmitted by the wireless communication module to the monitoring platform in the wireless network, and the message contains the identifiers of the wireless communication module and the monitoring platform in the wireless network. After receiving the message, the main router establishes the dedicated data links by identifying with the identifiers of the wireless communication module and the monitoring platform in the wireless network.

It is noted that there can be multiple dedicated data links established by the main router. The first dedicated data link and the second dedicated data link mentioned herein are only used to describe the method for transmitting the data messages. In another embodiment, there can be three or more dedicated data links. The first dedicated data link and the second dedicated data link can be different data links from the wireless communication module to the monitoring platform in the wireless network for data being transmitted from the main router toward the wireless communication module; or they can also be different data links from the monitoring platform in the wireless network to the wireless communication module for data being transmitted from the main router toward the monitoring platform in the wireless network. The different data links from the wireless communication module to the monitoring platform in the wireless network and the different data links from the monitoring platform in the wireless network to the wireless communication module can cross each other correspondingly, and they can also be completely independent from each other.

There may be multiple slave routers between the wireless communication module and the monitoring platform in the wireless network. Thus, in one embodiment, the point-to-point data links are not homogeneous, and the slave routers within each dedicated data link between the wireless communication module and the monitoring platform in the wireless network are completely different from those outside of that dedicated data link. Naturally in another embodiment, some of the slave routers within each dedicated data link between the wireless communication module and the monitoring platform in the wireless network can be the same as those outside of that dedicated data link. Since all slave routers' information are registered in the main router's unified routing table, the establishment of the dedicated data links is performed by the main router according to its unified routing table. To further elaborate, if the wireless communication module and the monitoring platform in the wireless network are not in the same sub-net, when establishing the dedicated data links, the unified routing table of the main router either sub-net in where the wireless communication module or the monitoring platform in the wireless network is in is used in establishing the dedicated data links, and the dedicated data links established are more than one and different from one another. On the other hand, if the wireless communication module and the monitoring platform in the wireless network are in the same sub-net, the establishment of the dedicated data links is directly depended on the unified routing table of that sub-net's main router.

There can be multiple dedicated data links established by the main router. The first dedicated data link and the second dedicated data link mentioned herein are only used to describe the method for transmitting the data messages. In one embodiment, three or more dedicated data links can be used. In addition, the data transmitted from the main router toward the wireless communication module in the first dedicated data link can be different from those in the second dedicated data link from the wireless communication module to the monitoring platform in the wireless network; or different data can be transmitted from the main router toward the wireless communication module in different data links from the monitoring platform in the wireless network to the wireless communication module. The different data links from the wireless communication module to the monitoring platform in the wireless network and the different data links from the monitoring platform in the wireless network to the wireless communication module can cross each other correspondingly, and they can also be completely independent from each other.

Furthermore, when using the first dedicated data link and the second dedicated data link between the communication module and the monitoring platform in the wireless network as the dedicated data links for conducting transmission of particular data messages between the wireless communication module and the monitoring platform in the wireless network, information of the first dedicated data link and the second dedicated data link are respectively assigned to a first data message and a second data message having identical data, and the slave routers in the fourth-generation (4G) communication network perform the data relay depending on the dedicated data links for the first data message and the second data message.

The first dedicated data link and the second dedicated data link can be different data links outside of the wireless communication module and the monitoring platform in the wireless network. The first dedicated data link and the second dedicated data link are independent from each other, so the first data message and the second data message do not interfere each other.

The links of the first dedicated data link and the second dedicated data link are established, which are the dedicated data links for transmitting data messages. When the wireless communication module and the monitoring platform in the wireless network conduct data messaging, the first dedicated data link and the second dedicated data link are respectively assigned to the first data message and the same second data message that contain the same information. Therefore, even if a dedicated data link is severed during data transmission or the transmitted data message is lost, the data message transmitted through the other dedicated data link is still available for processing without having to re-transmit from the wireless communication module, thus ensuring correct transmission of the data message.

S33: The wireless communication module transmits the electrical current digital signals to the monitoring platform through the first dedicated data link and the second dedicated data link.

Figure 3:
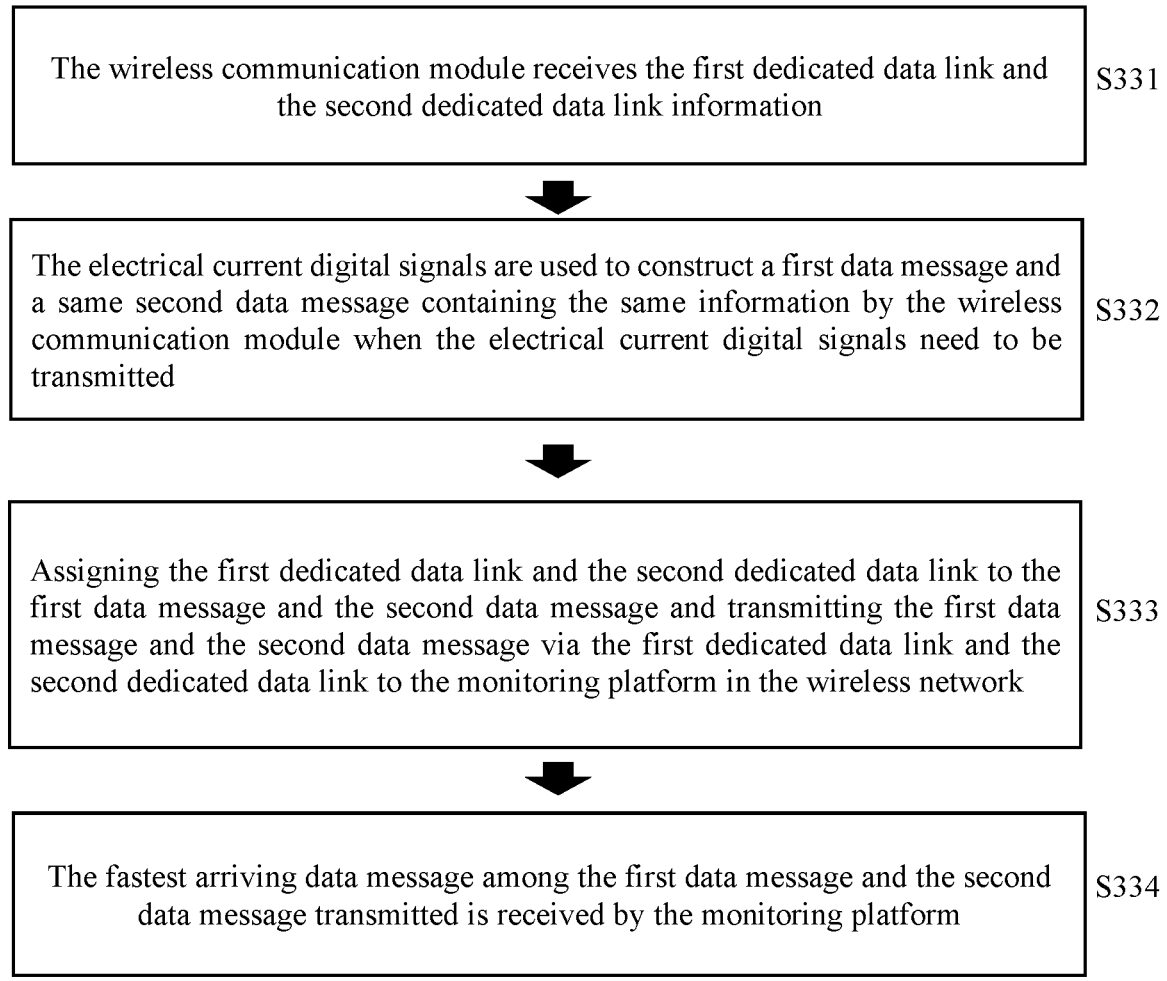
FIG. 3 depicts a schematic diagram of the step S33.

Furthermore, as shown in FIG. 3, the method of the wireless communication module transmitting the electrical current digital signals to the monitoring platform through the first dedicated data link and the second dedicated data link includes the following steps:

S331: The wireless communication module receives the information of the first dedicated data link and the second dedicated data link, which are the dedicated data links for transmitting data messages. Both the first dedicated data link and the second dedicated data link, which are the dedicated data links for transmitting data messages, are the links from wireless communication module to monitoring platform in wireless network.

S332: When the electrical current digital signals need to be transmitted, the wireless communication module generates the identical first data message and second data message from electrical current digital signals; as such, the first data message and the second data message contain the same electrical current information of the cable to be transmitted.

Furthermore, as shown in FIG. 4, generation of the identical first data message and second data message from electrical current digital signals by the wireless communication module includes the following steps:

S3321: Copying the electrical current digital signals transmitted from the cable and generating a duplicate of the electrical current digital signals transmitted from the cable. In order to prevent the monitoring platform in the wireless network from having the problem of not able to distinguish the first data message and from the second data message, it is necessary to embed a sequence code in the transmitted electrical current information of the cable in each data message to allow the monitoring platform to detect and distinguish the received data messages. Specifically, the data messages are copied to generate many duplicates, and each data message can be embedded with a sequence code before the wireless communication module transmits the data message. For example, the sequence code of the transmitted electrical current information of the cable within the first data message to be transmitted is K−1, and if the transmitted electrical current information of the cable within the second data message to be transmitted is consistent, the sequence code of the transmitted electrical current information of the cable within the second data message is K−2, K−3 for the third data message and so forth, etc. Naturally, the aforesaid sequence codes do not have any undesirable effect on the data message content, but only achieve the effect of distinguishing the data messages.

S3322: Assembling the electrical current digital signals transmitted from the cable into the first data message, and assembling a duplicate of the electric current digital signals into the second data message. The slave routers in the wireless network between the wireless communication module and the monitoring platform in the wireless network perform the data relay depending on the dedicated data links for the first data message and the second data message.

The assemblies of the first data message and the second data message are performed by pre-set assembling algorithms. The assembling algorithms differ only in the assembling format of the data message, and not in effect on the contents within the first data message and the second data message.

Furthermore, the slave routers in the wireless network between the wireless communication module and the monitoring platform in the wireless network can directly perform the data relay depending on the dedicated data links in the data message during transmission. In this way, it is not necessary for the slave routers in the wireless network to request a relay link from the main router when the slave routers relay the data message, thus reducing the consumption of the software and the hardware resources in the main router.

It should be noted that the data message is copied to create many duplicates, so it is also possible to establish multiple dedicated data links. Therefore, there may be multiple assembled data messages. The wireless communication module performs transmission of the data message and their duplicates via the first dedicated data link and the second dedicated data link, which are the dedicated data links for transmitting data messages. Therefore, even if a data message is corrupted during transmission, the monitoring platform in wireless network still can process the other data message duplicates, thus ensuring the correct transmission of the data message.

S333: Assigning the first dedicated data link and the second dedicated data link to the first data message and the second data message respectively and transmitting the first data message and the second data message via the first dedicated data link and the second dedicated data link to the monitoring platform in the wireless network. The slave routers in the wireless network between the wireless communication module and the monitoring platform in the wireless network perform the data relay depending on the dedicated data links of the first data message and the second data message.

By transmitting the first data message via the first dedicated data link and the second data message via the second dedicated data link respectively, the slave routers in the wireless network can relay the first data message depending on the first dedicated data link and relay the second data message depending on the second dedicated data link.

Because there are multiple dedicated data links, and multiple data messages containing the same information are transmitted, the monitoring platform in the wireless network can choose to process the information in accordance with the fastest arriving and error-free data message when receiving the data message. Therefore, it is possible to directly use the data message transmitted by another data link to process the data message when the data message transmitted in the data link is incorrect. This way is very convenient.

S334: The fastest arriving data message transmitted from the first data message and the second data message is received by the monitoring platform. The first data message is transmitted by the first dedicated data link, and the second data message is transmitted by the second dedicated data link. Both the first data message and the second data message have the same transmitted electrical current information of the cable.

When the wireless communication module transmits an data message to the monitoring platform in the wireless network, the data message with the same code value is transmitted via the first dedicated data link and the second dedicated data link, respectively. That is, the data message is transmitted to the wireless communication module twice via the first dedicated data link and the second dedicated data link respectively. However, when the monitoring platform in the wireless network respectively receives data messages through the first dedicated data link and the second dedicated data link, the before and the later data messages can be distinguished.

Furthermore, the process of receiving of the fastest arriving data message among the first data message and the second data message further comprising: the monitoring platform determining if the fastest arriving data message among the first data message and the second data message is an error-free data message. Specifically, there are many ways to determine if the first data message and the second data message are correct. For example, an error checking code is embedded in the first data message and the second data message, and the error checking code can be used to determine whether any one of the data messages is erroneous or not. The process of receiving of the fastest arriving data message further comprises: decoding the fastest arriving data message to obtain the electrical current digital signals in the data message if the data message is error-free, and then discarding the later arriving data message. Processing the fastest arriving data message without waiting for the arrival of the data messages, thereby reducing the wasteful idling time and ensuring that the data messages are transmitted in timely manner;

If it is so determined in the step S3-2 that one of the data messages is corrupted, the transmission of the data messages is to be performed by the monitoring platform in the wireless network. If the fastest arriving data message is erroneous, it means that the data messages are having a corrupted data message. The transmission of the data message is to is to be performed by the monitoring platform in the wireless network, with the fastest arriving data message discarded and the last receiving data message evaluated. And if the last receiving data message is error-free, it is decoded to obtain the electrical current digital signals; else if the data message is also erroneous, the last arriving data message is discarded, and a message regarding the faulty data message transmission is sent to the main router and the monitoring platform in the wireless network.

It should be noted that the method of sending a message regarding the faulty data message transmission to the main router and the monitoring platform in the wireless network further includes the following steps:

i.) the main router and the monitoring platform in the wireless network receive a message regarding the faulty data message transmission;

ii.) the main router monitoring the slave routers;

iii.) detecting a failed slave router and performing a re-establishment of the dedicated data link, wherein the re-established dedicated data link excludes the failed slave router from being used for relaying; and iv.) the main router sending the re-established dedicated data link information to the monitoring platform in the wireless network and the wireless communication module after the establishment is completed.

Specifically, if the last arriving data message is still erroneous, it means that all private data links have failures during relaying. After sending a message regarding the faulty data message transmission to the main router and the wireless communication module, the main router monitors the slave routers, detects a failed slave router and performs a re-establishment of the dedicated data link. The re-established dedicated data link excludes the failed slave router used for relaying. Finally, the main router sends the information of the re-established dedicated data link to the monitoring platform in the wireless network and the wireless communication module after the establishment is completed.

The wireless communication module receives the first data message and the second data message in the monitoring platform in the wireless network, which are transmitted via the first dedicated data link and the second dedicated data link. By determining that the data message is error-free, and then processing the fastest arriving data message, thereby ensuring that the data message is error-free and is transmitted in a timely manner.

It should be noted that the wireless communication module may be a third-generation (3G) communication module or a fourth-generation (4G) communication module, and the monitoring platform is a personal computer, a notebook, and a computer, etc.

Example 2

Example 2 differs from the Example 1 in that the main router comprises a receiving unit, an establishment unit, and a delivery unit. Specifically, the main router comprises a receiving unit, an establishment unit, and a delivery unit. The receiving unit is used for receiving the link establishment instruction. In Example 2, the link establishment instruction contains an identifier of the wireless communication module and the monitoring platform in the wireless network. The establishment unit establishes the first dedicated data link and the second dedicated data link between the wireless communication unit and the monitoring platform in the wireless network depending on the link establishment instruction; the delivery unit is used to send the information of the first dedicated data link and the second dedicated data link to the wireless communication unit and the monitoring platform in the wireless network so that the first dedicated data link and the second dedicated data link are respectively assigned to the first data message and the second data message that contain the same information when the wireless communication unit and the monitoring platform in the wireless network transmit the data messages, and the slave routers in the wireless network perform the data relay depending on the dedicated data links in the first data message and the second data message during transmission.

Example 3

Example 3 differs from the above examples in that the method for transmitting the electric power data of a rail relies on a rail potential limiting system. Specifically, the rail potential limiting system includes an enhanced urban rail traction returning device. The enhanced urban rail traction returning device comprises one or more interconnected anchor segments. The anchor segments include a conductor rail, an intermediated joint of the enhanced urban rail traction returning device, an insulation support, and an anchor node. The lower part of the insulation support is fixed on the track beds outside the running rails. The T-shaped groove below the conductor rail is installed in a T-shaped block above the insulation support, and the adjacent part of two conductor rails are fixed by the intermediated joint.

Furthermore, there is no any anchor node on the anchor segments. The anchor node includes two anchor blocks, which are fixed under the conductor rail and located on both sides of the T-shaped block, respectively. There is a T-shaped stop between the anchor segments and the T-shaped block, and the upper part of the T-shaped stop is inserted in the T-shaped groove. There is a cable connection terminal fixed on the intermediated joint, and the cable connection terminal is electrically connected to the running rails through the cable.

The anchor block includes two T-shaped locking blocks with an internally threaded hole, and a briquetting. The two T-shaped locking blocks are installed side by side in the T-shaped groove, and the briquetting is located under the T-shaped groove. The briquetting is penetrated by the bolt and being locked with the internally threaded hole on the T-shaped locking blocks. Therefore, the briquetting can be locked and fixed under the conductor rail, and being installed on the outside of the T-shaped stop, which consists of two symmetrically mounted L-shaped stops.

The enhanced urban rail traction returning device decomposes the backflow pressure of the running rails, reduces the potential of the running rails, and ensures the safety of personnel and the equipment. The device can also reduce the stray current, and reduce the impact on the surrounding buildings, equipment, communication signals, etc., thus ensuring the safety of train lanes. This device has the advantages of simple structure, low cost, and convenient installation.

It should be noted that an electric current sensor is connected in series on the cable, and it is connected to the single-chip microcomputer processing module. The electric current sensor can be connected with the single-chip microcomputer processing module through the signal amplification of the circuit and the filter circuit so that the electrical current information collected by the electric current sensor could be amplified and filtered, and then being sent to the single-chip microcomputer processing module, which is connected to the wireless communication module. The wireless communication module is connected to a monitoring platform in a wireless network. The wireless communication module is a 3G-module or a 4G-module, and the monitoring platform is a personal computer, a notebook, or a computer.

The connection structure between the wireless communication module and the monitoring platform in the wireless network includes: a main router in wireless network, a wireless communication module, a monitoring platform in wireless network, and multiple slave routers in the wireless network. There are more than seven slave routers, which are connected to the main router. The wireless communication module and the monitoring platform in the wireless network are connected to a pair of slave routers, respectively.

It should be noted that the above embodiments are only used to explain the technical scheme of the invention, not the limitation. Although the invention is described in detail with reference to the preferred embodiments, it should be understood by those skilled in the art that the technical scheme of the invention can be modified or replaced equally without departing from the spirit and scope of the technical scheme of the invention which should be covered in the right of the invention.

What is claimed is:

1. A method for transmitting an electric power data of a rail, comprising:
    collecting electrical current analog signals from a conductor rail and transmitting the electrical current analog signals to a processing module;
    converting the electrical current analog signals into electrical current digital signals through the processing module; and
    transmitting the electrical current digital signals to a monitoring platform through a wireless communication module;
    wherein said transmitting the electrical current digital signals to the monitoring platform through the wireless communication module comprises the following steps:
    sending a link establishment instruction from the wireless communication module to a main router;
    the main router establishing a first dedicated data link and a second dedicated data link between the wireless communication module and the monitoring platform in a wireless network in accordance with the link establishment instruction and sending the first dedicated data link and the second dedicated data link information to the wireless communication module and the monitoring platform in the wireless network; and
    the wireless communication module transmitting the electrical current digital signals to the monitoring platform via the first dedicated data link and the second dedicated data link.

2. The method for transmitting the electric power data of a rail according to claim 1, characterized in that electrical current information of the conductor rail is collected by an electric current sensor set on a cable, wherein the cable is connected to the conductor rail.

3. The method for transmitting the electric power data of a rail according to claim 2, characterized in that the electrical current information collected by the electric current sensor is transmitted to the processing module after a pre-processing, wherein the pre-processing comprises signal amplification and filtering.

4. The method for transmitting the electric power data of a rail according to claims 1, characterized in that the link establishment instruction is an identifier of the wireless communication module and the monitoring platform in the wireless network.

5. The method for transmitting the electric power data of a rail according to claims 4, characterized in that the method of the wireless communication module transmits the electrical current digital signals to the monitoring platform through the first dedicated data link and the second dedicated data link comprises the following steps:
    the wireless communication module receiving the first dedicated data link and the second dedicated data link;
    the electrical current digital signals are used to construct a first data message and a second data message containing same information by the wireless communication module when the electrical current digital signals need to be transmitted;
    assigning the first dedicated data link and the second dedicated data link to the first data message and the second data message and transmitting the first data message and the second data message via the first dedicated data link and the second dedicated data link to the monitoring platform in the wireless network; and the fastest arriving data message transmitted from the first data message and the second data message being received by the monitoring platform.

6. The method for transmitting the electric power data of a rail according to claims 5, characterized in that the method of the electrical current digital signals are constituted to the same first data message and the same second data message by the wireless communication module when the electrical current digital signals need to be transmitted, comprising the following steps:

copying the electrical current digital signals transmitted from the cable and generating a duplicate of the electrical current digital signals transmitted from the cable; and assembling the electrical current digital signals transmitted from the cable into the first data message, and assembling the duplicate of the electrical current digital signals into the second data message.

7. The method for transmitting the electric power data of a rail according to claims 6, characterized in that the method of the fastest arriving data message transmitted from the first data message and the second data message is received by the monitoring platform further comprising:

the monitoring platform determining if the fastest arriving data message among the first data message and the second data message transmitted is error-free;

decoding the fastest arriving data message to obtain the electrical current digital signals in the data message if the fastest arriving data message is error-free, and then discarding the later arriving data message;

discarding the fastest arriving data message and determining whether the last arriving data message is erroneous;

decoding the last arriving data message to obtain the electrical current digital signals in the data message if the last arriving data message is error-free;

if the last arriving data message is erroneous, discarding the last arriving data message, then sending a message regarding faulty data message transmission to the main router and the monitoring platform in the wireless network.

8. The method for transmitting the electric power data of a rail according to claims 7, characterized in that the sending of the message regarding faulty data message transmission to the main router and the monitoring platform in the wireless network further comprising:

the main router and the monitoring platform in the wireless network receiving the message regarding faulty data message transmission;

the main router monitoring one or more slave routers;

detecting a failed slave router and performing a re-establishment of the dedicated data link, wherein the re-established dedicated data link excludes the failed slave router from being used for relaying; and the main router sending the re-established dedicated data link information to the monitoring platform in the wireless network and the wireless communication module after the establishment is completed.

9. The method for transmitting the electric power data of a rail according to claims 8, characterized in that the main router comprises a receiving unit, an establishment unit, and a delivery unit.

10. The method for transmitting the electric power data of a rail according to claims 9, characterized in that the wireless communication module is a third-generation (3G) communication module or a fourth-generation (4G) communication module.

11. The method for transmitting the electric power data of a rail according to claims 10, characterized in that the monitoring platform comprises a personal computer, a notebook, or a computer.

\* \* \* \* \*